July 22, 1958 G. R. SUTHERLAND ET AL 2,844,417
BEARING STRUCTURE
Filed Dec. 14, 1955
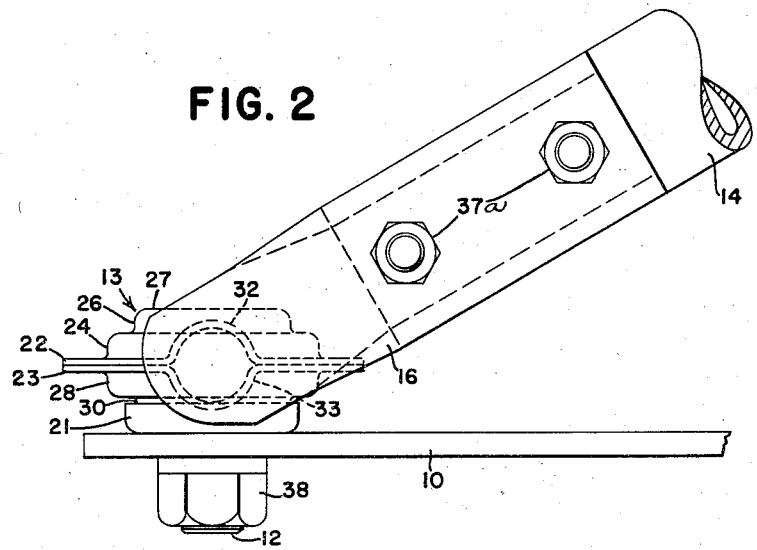
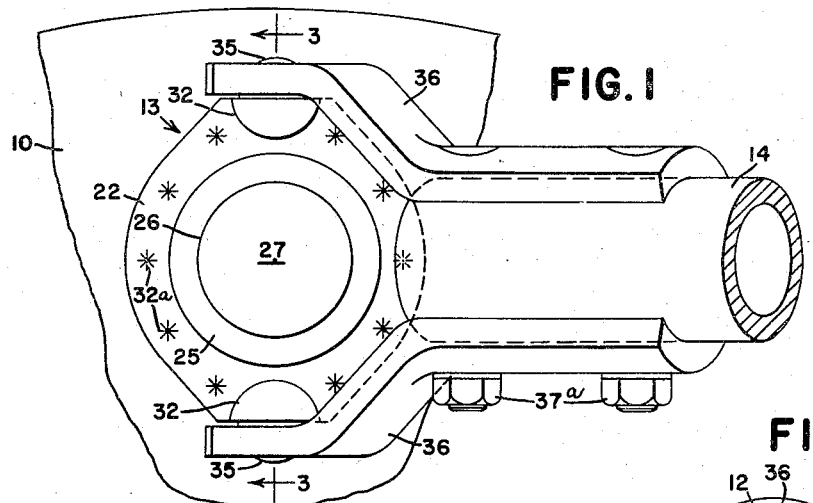
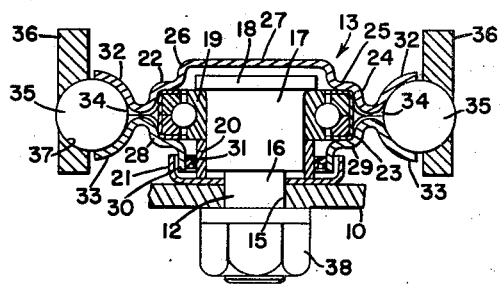
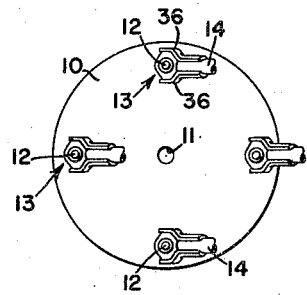
INVENTORS
G. R. SUTHERLAND
A. E. BREED United States Patent Office 2,844,417
Patented July 22, 1958

2,844,417

BEARING STRUCTURE

Gail R. Sutherland and Arie E. Breed, Ottumwa, Iowa, assignors to Deere Manufacturing Co., Dubuque, Iowa, a corporation of Iowa Application December 14, 1955, Serial No. 553,075

3 Claims. (Cl. 308—15)

This invention relates to a bearing structure and more particularly to an improved and economical bearing for use in mounting an oscillating member on a rotating member.

The structure finds particular utility in the field of side delivery rakes, wherein a typical rake includes a pair of spaced apart rotors or spiders. Each spider carries a plurality of uniformly angularly spaced mounting shafts or studs to which oscillating tooth-supporting pipes are connected respectively at their opposite ends, each pipe having one end connected to a stud on one rotor and its opposite end connected to a corresponding stud on the other rotor. Hence, the arrangement is such that each tooth pipe end must be mounted on its spider for rotation about an axis parallel to the axis of rotation of the spider. In addition, the mounting of the tooth pipe end must include an axis normal to the axis of the stud to compensate for toothpipe oscillation due to centrifugal loading, and to accommodate a limited amount of misalinement due to manufacturing inaccuracies. Various arrangements satisfying the general requirements have already been developed, but most of these have certain inherent disadvantages, such as high cost, short life, etc.

According to the present invention, the bearing is simplified, featuring a main member preferably made up of a pair of similar plates welded together in face-to-face relationship, the plates being centrally apertured in register to provide a main bearing receiver for mounting on the rotor or spider stud. In addition, the plates are formed at diametrically opposed portions thereof with substantially hemi-spherical pockets and each pocket receives a ball by means of which the bifurcated end of a tooth pipe is supported. Another feature of the structure is the provision in the plates of coaxial cylindrical portions which cooperate to carry an antifriction bearing for receiving the spider stud. A further feature of the invention is the provision in one of the plate members of an integral radial wall which closes its cylindrical portion and therefore seals the bearing against the entrance of dirt and other foreign material.

The foregoing and other important objects and desirable features inherent in and encompassed by the invention will become apparent as a preferred embodiment thereof is disclosed in detail, by way of example, in the following specification and accompanying sheet of drawings, the several figures of which will be described immediately below.

Fig. 1 is a fragmentary elevation of the improved structure.

Fig. 2 is a bottom plan view of the same.

Fig. 3 is a section on the line 3—3 of Fig. 1.

Fig. 4 is a schematic illustration, on a reduced scale, showing a rotor and the use of the bearing structures for supporting a plurality of tooth-supporting pipes.

Reference will be had first to Fig. 4 for a description of the general structure involved. In that figure, the numeral 10 designates the rotor or spider of a side delivery rake. This rotor is mounted at its center at 11 for rotation about a horizontal axis. It will be understood that there is a similar rotor in laterally spaced relationship to the rotor 10 and that the axes of rotation of the two rotors are parallel. The rotor 10 has thereon a plurality of mounting studs or shafts 12, each of which cooperates with a bearing, designated generally by the numeral 13, to mount the bifurcated end of a tooth-supporting pipe or rake bar 14. The opposite end of each tooth pipe is similarly bifurcated and is carried by a similar bearing structure (like 13) on the other rotor (not shown). From the foregoing, it will be clear that as the rotors rotate about their central axes, the tooth pipes 14 oscillate. Normally, the two rotors are offset fore-and-aft so that their radial faces lie in offset parallel planes. Therefore, each bearing structure 13 must include, in addition to the bearing axis at 12, a second axis (here upright) to accommodate deflection and other angular movement of the tooth pipes relative to the planes of the rotors. The details of each bearing structure 13 will be brought out below.

As best shown in Fig. 3, the rotor 10 is apertured at 15 to receive a reduced shoulder portion 16 on the shaft or stud 12, the latter having an enlarged cylindrical portion 17 which terminates in a still further enlarged annular flange 18. An antifriction bearing 19 is received by the cylindrical portion 17 and is confined between the shoulder or flange 18 and the inner face of the rotor 10 by means of a spacer 20. A sealing cup 21, for purposes to presently appear, is interposed between the rotor 10 and the proximate marginal edge of the spacer 20.

The bearing 19 is received in and journals the bearing structure 13. This structure comprises a pair of plates 22 and 23, each shaped at its central portion with a central recess or depression to cooperate with each other to afford a main bearing receiver for the bearing 19. The manner in which this is accomplished is clear from the provision on the plate 22 of a central annular or cylindrical portion 24 which thus defines an annulus for receiving one-half of the outer race of the bearing 19. The cylindrical portion includes a radially inward offset 25, a cylindrical offset 26 and an integral radial closure wall 27. The other plate has a similar cylindrical portion 28, which is coaxial with or in register with the cylindrical portion 24 of the plate 22. The portion 28 has an integral radial offset 29 and a cylindrical offset 30, the latter being open to receive the spacer 20 and being annularly received within the sealing cup 21. A suitable lubricant seal is provided at 31.

The two plates are placed in face-to-face relationship and are rigidly secured together, as by spot welding at 32ª (Fig. 1). The plate 22 is provided at diametrically opposed portions thereof, as respects the axis of the shaft 12, with recesses, here substantially quarter-spherical portions 32, and similar portions 33 are provided on the plate 23. The portions 32 respectively complement the portions 33 to afford pockets 34 which assume substantially hemi-spherical form, and each pocket carries a pintle or pivot member, here a ball 35. The shapes of the pockets, here slightly less than hemi-spherical, are such as to loosely receive the balls; although, the balls may be rigidly secured in the pockets by welding, if desired.

The bifurcated end of the tooth pipe 14 comprises a pair of furcations or straps 36, each of which has a part-spherical recess 37 for receiving the associated ball 35. The furcations 36 are preferably removably secured to the tooth pipe 14, as by bolts and nuts 37ª. The plates 22 and 23 are welded together with the antifriction bearing 19 contained within the receiver afforded by the complementary portions 24—25 and 28—29. The stud or shaft 12 is, of course, retained in the bearing 19 because of the annular shoulder or flange 18. Therefore, the bearing structure is provided as a pre-assembled unit and it may be readily mounted on the rotor 10 by means of a nut 38 threaded on a threaded end of the shaft 12. Connection between the bearing structure 13 and the tooth pipe 14 is effected by removing or otherwise separating the furcations 36 so that the balls 35 may be placed in the pockets 34 to be retained by the recesses 37, after which the nuts and bolts 37ª are tightened.

It will thus be seen that a simple and economical bearing structure has been provided, featuring pre-assembly and ready replacement in the event of damage or wear. Features not categorically enumerated herein will undoubtedly occur to those versed in the art, as will many modifications and alterations in the preferred embodiment of the invention disclosed, all of which may be achieved without departure from the spirit and scope of the invention as defined in the appended claims.

What is claimed is:

1. A bearing structure, comprising: a stub shaft having a free end and an opposite headed end; a bearing of the type having inner and outer races and a circumferential row of balls therebetween, said bearing being mounted on the shaft via said inner race with one side of said inner race abutting the headed end of the shaft and the free end of said shaft projecting axially beyond the other side of the bearing; a pair of complementary plate-like members respectively having coaxial central cup portions facing each other to embrace the outer race of the bearing from opposite sides, one of the cup portions being coaxially open to enable the free end of the shaft to project therethrough and the other cup portion having a radial wall portion overlapping the headed end of the shaft so that said headed end is axially confined between the one side of the inner race and said wall portion, said plate-like members having flat portions extending radially outwardly from the cup portions to congruent marginal edges and said flat portions being secured together in face-to-face contact in a radial plane normal to the shaft axis and including the centers of the balls in said row; and means on the members providing a pair of diametrically opposed radially outwardly opening pintle-receiving pockets, said means at each pocket including complementarily formed marginal edge portions of the members displaced symmetrically from said radial plane so that the pockets are coaxial on a line in said plane and intersecting the shaft axis.

2. In a reel assembly including a rotor having a shaft-receiving aperture spaced radially from its axis of rotation and a bar having an end portion adjacent to the opening, the improvement residing in a bearing structure connecting the bar to the rotor, comprising: a stub shaft having a free end received in said opening and an opposite headed end spaced from the rotor; a bearing of the type having inner and outer races and a circumferential row of balls therebetween, said bearing being mounted on the shaft via said inner race with one side of said inner race abutting the headed end of the shaft and the free end of said shaft projecting axially beyond the other side of the bearing; a pair of complementary plate-like members respectively having coaxial central cup portions facing each other to embrace the outer race of the bearing from opposite sides, one of the cup portions being coaxially open to enable the free end of the shaft to project therethrough and the other cup portion having a radial wall portion overlapping the headed end of the shaft so that said headed end is axially confined between the one side of the inner race and said wall portion, said plate-like members having flat portions extending radially outwardly from the cup portions to congruent marginal edges and said flat portions being secured together in face-to-face contact in a radial plane normal to the shaft axis and including the centers of the balls in said row; means on the members providing a pair of diametrically opposed radially outardly opening pintle-receiving pockets, said means at each pocket including complementarily formed marginal edge portions of the members displaced symmetrically from said radial plane so that the pockets are coaxial on a line in said plane and intersecting the shaft axis; a pair of pintles received respectively in the pockets; and a pair of strap members secured to the bar end portion in diametrically opposed relation and respectively engaging and confining the pintles.

3. The invention defined in claim 2, in which: each pocket is substantially hemi-spherical, each pintle is a ball, and each strap member has a ball-receiving recess therein.

References Cited in the file of this patent

UNITED STATES PATENTS

| 1,705,731 | Hufferd | Mar. 19, 1929 |
| 2,652,291 | Magarian | Sept. 15, 1953 |
| 2,690,045 | Erickson | Sept. 28, 1954 |

FOREIGN PATENTS

| 470,984 | Italy | Apr. 30, 1952 |
| 153,392 | Australia | Sept. 25, 1953 |